United States Patent
Sivonen et al.

[11] Patent Number: 6,158,897
[45] Date of Patent: Dec. 12, 2000

[54] GEAR WITH BEARING ARRANGEMENT

[75] Inventors: Matti Sivonen, Vaajakoski; Jouni Määttä, Palokka, both of Finland

[73] Assignee: Valmet Voimansiirto Oy, Finland

[21] Appl. No.: 09/101,494

[22] PCT Filed: Jan. 9, 1997

[86] PCT No.: PCT/FI97/00006

§ 371 Date: Feb. 1, 1999

§ 102(e) Date: Feb. 1, 1999

[87] PCT Pub. No.: WO97/25553

PCT Pub. Date: Jul. 17, 1997

[30] Foreign Application Priority Data

Jan. 10, 1996 [FI] Finland .................................. 960111

[51] Int. Cl.⁷ .................................................. F16C 41/02
[52] U.S. Cl. .......................................... 384/518; 74/421 R
[58] Field of Search ................................... 384/517, 518,
384/563, 546, 547; 74/421 R

[56] References Cited

U.S. PATENT DOCUMENTS

| | | |
|---|---|---|
| 3,144,283 | 8/1964 | Gamet . |
| 3,648,533 | 3/1972 | Parenti ....................................... 74/410 |
| 3,716,280 | 2/1973 | Leibensperger et al. . |
| 3,948,577 | 4/1976 | Gamet . |
| 4,227,755 | 10/1980 | Lundberg ............................... 384/518 |
| 4,279,451 | 7/1981 | Heldt . |
| 4,611,935 | 9/1986 | Rode ........................................ 384/548 |
| 4,668,109 | 5/1987 | Basso ....................................... 384/518 |
| 5,061,089 | 10/1991 | Bair et al. ............................... 384/535 |
| 5,067,827 | 11/1991 | Bokel ....................................... 384/537 |
| 5,623,345 | 4/1997 | Graft et al. ......................... 384/563 X |

FOREIGN PATENT DOCUMENTS

| | | |
|---|---|---|
| 0717208 | 6/1996 | European Pat. Off. . |
| 57175 | 4/1972 | Finland . |
| 67436 | 6/1980 | Finland . |
| 3710185 | 10/1988 | Germany . |
| 1373372 | 11/1974 | United Kingdom . |
| 1491132 | 11/1977 | United Kingdom . |

*Primary Examiner*—Thomas R. Hannon
*Attorney, Agent, or Firm*—Steinberg & Raskin, P.C.

[57] ABSTRACT

A gear including a frame, a first shaft, a first gearwheel arranged on the first shaft and in engagement with a second gearwheel mounted on a second shaft, the second shaft including bearings at both sides of the second gearwheel between the frame and the second shaft. The second shaft revolves about the bearings placed on each side of the second gearwheel. At least one spring is fitted to act with a force upon an outer race of rolling members of one of the bearings. A glide fitting is provided between a circumferential face of the outer race and the gear frame or a connected part. The force effect applied by the spring(s) is transferred through the rolling members of the bearing to the inner race of the bearing and further to the other bearing placed at the opposite side of the gearwheel whereby the play in both bearings between the rolling members and the bearing races is eliminated.

19 Claims, 4 Drawing Sheets

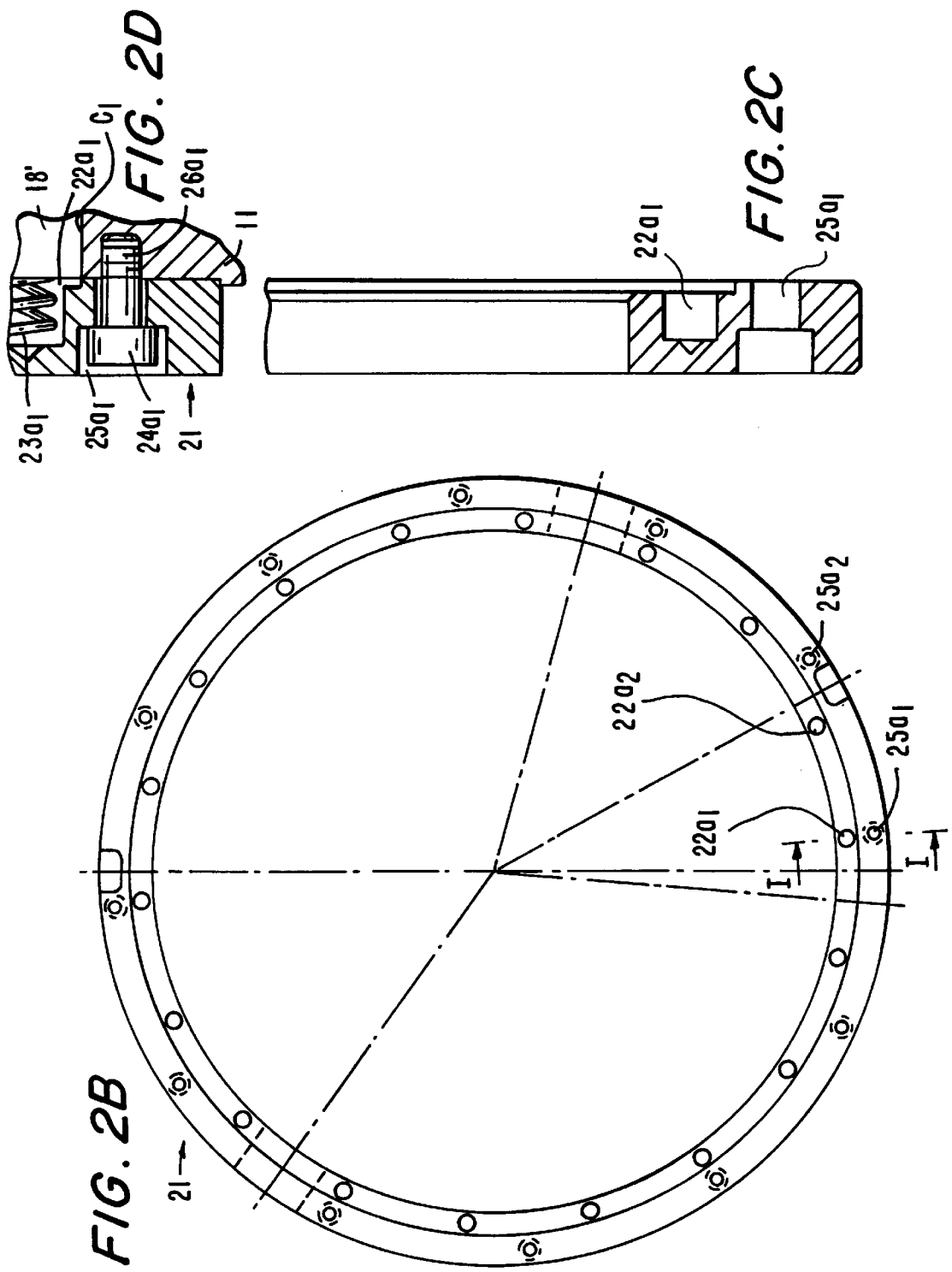

GEAR WITH BEARING ARRANGEMENT

FIELD OF THE INVENTION

The invention concerns a gear.

BACKGROUND OF THE INVENTION

From the prior art, minimization of the bearing play is known by using a separate transfer mechanism, a screw device, by whose means the play is minimized by shifting the bearing race in the lateral direction. In the prior-art solutions, the shifting of the bearing race takes place expressly by means of a separate positioning actuator.

OBJECTS AND SUMMARY OF THE INVENTION

In the present patent application, attempts have been made to find a solution for the problem of bearing play, in particular in a gear in which the gear comprises a high-speed shaft and a low-speed shaft, in which connection the high-speed shaft is fitted to rotate the low-speed shaft. The low-speed shaft is mounted from both sides of the toothed rim by means of rolling ball bearings. In a prior-art solution of said sort, in particular with increasing speeds, problems arise in the bearings of the low-speed shaft. In particular in paper machine drives, when temperatures vary, the bearing plays must be adequate in order that a reliable operation of the bearing could be guaranteed under all conditions of operation. In a gear, it is possible to speak of a load effect point at the point at which the high-speed shaft is in contact with the low-speed shaft. In a normal situation of loading, attempts are made to minimize the forces applied to the bearings by balancing the gear by means of a torque support from a suitable point on the outside frame constructions. When the balancing is successful, the bearing fully relies on its plays and is, in such a case, susceptible of oscillation. In such a case, outside impulses produce an increased risk of damage in the bearing means. When the gear is used in a paper machine drive, high changes in the thermal load arise on the grooved ball bearings placed at both sides of the gearwheel of the low-speed shaft, which changes further result in a requirement of a large play. When the play becomes larger, some of the rolls glide along the race track, in which case bearing damage and bearing wear are increased. According to the present invention, the service life of the bearings of the low-speed shaft has been increased by using a separate spring device in the lateral shifting of the bearings. The spring device is fitted so that its springs act upon the bearings of one of the bearing races, so that the spring force is applied outwards from the area between the bearings and upon the outer bearing race. The bearing race is mounted by means of a glide fitting on the frame of the bearing housing, and by means of the springs the bearing race is shifted outwards in the construction. In this way the bearing play is eliminated and the rolling members are shifted into contact with their bearing races, both with the inner bearing race and with the outer bearing race. When the rolling members are shifted into contact with the inner bearing race, the force acts upon the gearwheel shaft connected with the inner bearing race, and the inner race of the other bearing is now further shifted, in its turn, so that the shifting takes place towards the vertical central axis Y of the bearing. Thus, by means of the same spring device, the plays are eliminated from two sets of bearing means, both from one side and from the other side of the gearwheel.

BRIEF DESCRIPTION OF THE DRAWINGS

The invention will be described in the following with reference to some preferred embodiments of the invention illustrated in the figures in the accompanying drawings, the invention being, however, not to be confined to said embodiments alone.

FIG. 2B is a separate illustration of a ring with spring sockets in accordance with the present invention.

FIG. 2C is a sectional view taken along the line I—I in FIG. 2B.

FIG. 2D is an illustration in part of the fixing of the ring with spring sockets to the gear frame.

DETAILED DESCRIPTION OF THE PREFERRED EMBODIMENTS

Figure 1:
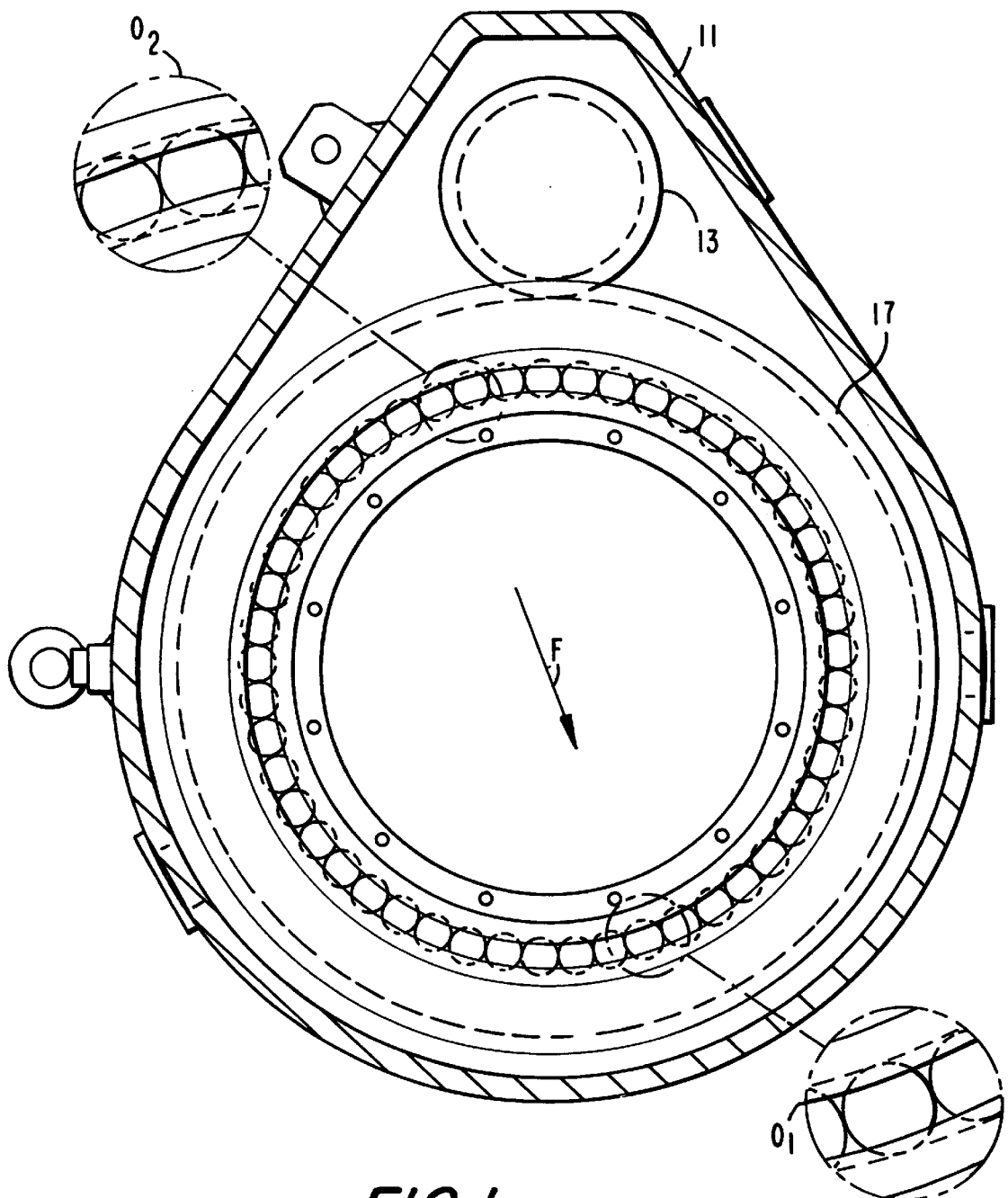
FIG. 1 illustrates the situation occurring at the load effect point in a bearing construction.

FIG. 1 illustrates the situation caused by the load effect point in particular in bearing constructions of large, 500 mm . . . 800 mm, diameter. In the prior-art situation shown in FIG. 1, the load acts upon the point P. The direction of effect of the force is indicated by the arrow $F_1$. In such a case, the play is at the minimum at the side opposite to the load (point $O_1$) and at the maximum at the side of the load (point $O_2$). The rolling members in the bearings glide (at the point $O_2$) and do not revolve along their race track faces. This further results in wear and possibly in bearing damage. The situation is made worse, in particular with large bearing diameters ($\phi$ 500 mm . . . $\phi$ 800 mm), especially by the fact that the bearing play must be relatively large in order that the variations occurring in the thermal load could be taken into account. When the play is large between the rolling members and the bearing rings or races in the bearing construction, a situation is also possible in which, when the gear is well balanced by means of a torque arm, oscillations further cause resonance in the bearing members. In such a case, the susceptibility of the bearings to damage is increased further.

Figure 2A:
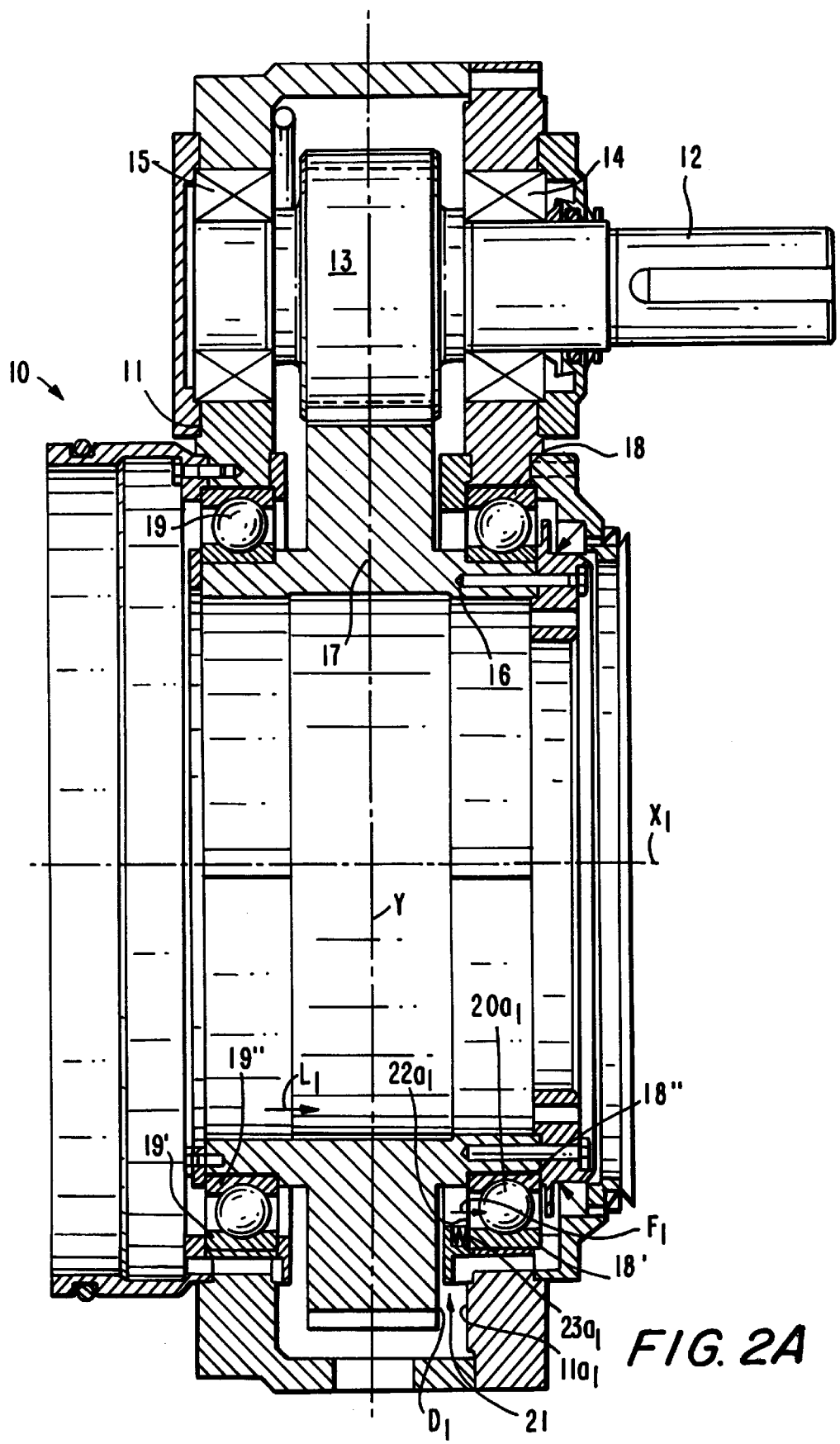
FIG. 2A is a sectional view of a gear construction in accordance with the present invention.

FIG. 2A illustrates a gear in accordance with the present invention. The gear 10 comprises a frame 11. The drive is introduced into the gear through the shaft 12. The shaft 12 is mounted from both sides of its gearwheel 13 by means of bearing means 14 and 15. The high-speed shaft 12 is fitted to rotate the shaft 16 comprising the gearwheel of larger diameter. The shaft 16 comprises the gearwheel 17 and the bearing means 18 and 19 at both sides. The bearing means 18 and 19 can be grooved ball bearings, tapered roller bearings or angular-contact ball bearings. They are preferably single-row bearings, which means that the bearing members are placed in one row only between the inner race and the outer race of the bearing. Each bearing 18,19 comprises rolling members $20a_1$ such as rollers, balls or equivalent, between its races, i.e. the inner race and the outer race. The rolling members run in the inner circumferential grooves in their bearing races.

According to the invention, the construction is provided with spring means, which comprise a ring 21 with spring sockets, and in the different spring sockets $22a_1$, in the ring 21 there are the springs $23a_1$ preferably spiral springs. The ring 21 with spring sockets is attached to the side face $11a_1$ of the gear frame 11 by means of screws $24a_1$. Thus, the ring 21 with spring sockets is placed between the side face $11a$ and the side face $D_1$ of the gear wheel 17 placed on the shaft 16. Thus, the springs $23a_1$ of the ring 21 with spring sockets are fitted to act with a force outwards from the vertical centre line (Y line) of the bearing construction (force arrows in the direction $L_1$ and in the direction of the axis $X_1$ of rotation). The construction is fitted in such a way in relation to the outer race of the bearing 18 that the ring 21 with spring sockets is fixed by means of screws $24a_1$ to the frame 11 above the side face $C_1$ of the outer race 18' of the bearing so that the springs $23a_1$ press the race 18' with a force and act upon its front face. The circumferential face $C_1$ of the outer race 18' of the bearing 18 is fitted with a glide fitting on the frame 11 of the gear. Then, the bearing race 18' can be displaced in the direction of the axis of rotation ($X_1$ axis) of the gear so that the rolling members $20a_1$ of the bearing can be brought into contact both with the side face of the inner rolling groove of the outer race 18' of the bearing and with the side face of the inner rolling groove of the inner race 18" of the bearing. Thus, as is shown in the figure, the force F acts in the direction $L_1$ and shifts the rolling members $20a_1$ of the bearing means into contact both with the side of the rolling groove of the outer race 18' of the bearing 18 and with the side face of the rolling groove of the inner race 18" of said bearing. Thus, the plays between the rolling members $20a_1$ of the bearing and the bearing races 18',18" have been eliminated. Thus, the force effect is transferred from the outer race 18' further to the inner race 18" and further to the shaft 16, which is also shifted in the direction $L_1$. In this connection, the force acts upon the inner race 19" of the second bearing means 19, and thereby the play is also eliminated in said second bearing 19 of the shaft. It is an essential feature that the shaft 16 is floating, i.e. freely moving in its axial direction (direction $X_1$). The bearing 19 is fixed to the gear so that both the inner race 19" of the bearing 19 is fitted on the shaft 16 with a press fitting, i.e. stationarily, and the outer race 19' of the bearing 19 is mounted stationarily on the connected gear construction 11, preferably likewise with a press fitting. However, since the shaft 16 can be displaced in the direction of the central axis and axis of rotation ($X_1$ axis) of the shaft 16, by means of the force F it is also possible to shift the rolling members $20a_1$ of the bearing against the side faces of the inner rolling grooves or rolling tracks of their bearing races 19' and 19". Thus, in this connection, by means of the springs $23a_1$, it is possible to eliminate the play also in respect of the second bearing means.

Thus, it is not at all self-evident in what area of the bearing means the force F of the springs $23a_1$ is fitted to act, or in what direction in relation to the vertical central axis (Y axis) of the gear. In the construction in accordance with the invention, the springs $23a_1$ act upon two sets of bearing means at both sides of the gearwheel 17 on the shaft 16 in the gear 10. According to the invention, when the force F is effective away from the Y axis in the direction of the central axis of rotation (X axis) of the gear, the bearing means are brought into a what is called O position, in stead of the other alternative, i.e. the X position. In the so-called O position, the rolling axes of the bearing means are placed circumferentially, and, on the other hand, in the X position the rolling axes of the bearing means are placed so that the rolling axes intersect each other in the centre point of the journalling. From the point of view of the stability of the journalling, said so-called O position is preferable. In the construction in accordance with the invention, when the spring means act outwards from the vertical centre line (Y line) of the gear and when the spring means act expressly upon the outer bearing race, the so-called O position is accomplished in the journalling. The vertical centre line Y passes through the middle of the gearwheel 17 perpendicularly to the axis $X_1$ of rotation.

FIG. 2B is a separate illustration of the ring 21 with spring sockets as a side view. FIG. 2C is a sectional view taken along the line I—I in FIG. 2B. The ring 21 with spring sockets is fitted in the area between the bearing means 18 and the gearwheel 17 so that the spring sockets $22a_1$ in the ring 21 with the spring sockets are opened outwards, in which case the springs $23a_1$ fitted in the spring sockets $22a_1$, preferably spiral springs, cup springs, or equivalent, are fitted to act with a force F upon the outer race 18' of the bearing means, which outer race is fitted to the gear or to a connected construction with a glide fitting. The ring 21 with spring cavities includes holes $25a_1$ through which the fastening screws $24a_1$ are passed and threaded further into the threaded holes provided in the side face $11a_1$ of the frame 11 of the gear. The springs $23a_1$ are dimensioned so that normal thermal expansion does not produce an excessive additional load on the bearings but, on the other hand, the spring force is sufficient to prevent gliding (stopping) of the bearing rollers in a situation of operation.

FIG. 2D shows an alternative of fixing the ring with spring sockets to the frame by means of screws $24a_1$ which have been passed through the holes $25a_1, 25a_2 \ldots$ into the threaded holes $26a_1$ in the frame.

Figure 3A:
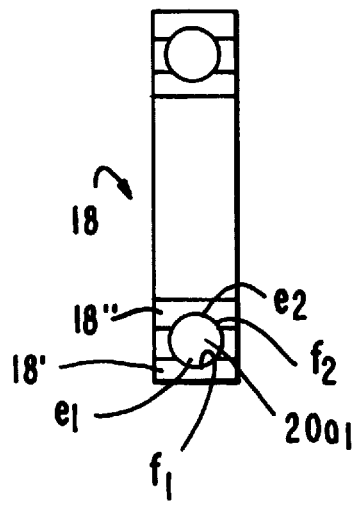
FIGS. 3A, 3B, 3C and 3D show different bearing constructions which are suitable for use in a gear in accordance with the present invention and in a spring loading in accordance with the present invention.
Figure 3B:
Figure 3C:
Figure 3D:

FIG. 3A shows a conventional grooved ball bearing, which can be used in the journalling in accordance with the present invention and whose outer race can be acted upon by means of the spring loading device of the invention. In FIG. 3A, the point of effect and the direction of effect of the spring force are indicated by the arrow F. Thus, the bearing means $20a_1$ are shifted into contact both with the side face $f_1$ of the race track $e_1$ of the outer race 18' of the bearing and with the side face $f_2$ of the race track $e_2$ of the inner race 18" of the bearing. Thus, the play is eliminated between the bearing members $20a_1$ and the related bearing races 18' and 18". In FIG. 3C a tapered roller bearing is shown, to which the invention is also applicable. FIG. 3B shows an angular-contact ball bearing, for which the invention is also suitable, as it is for the double-row bearing shown in FIG. 3D. By means of the spring rim, forces of about 3000 ... 5000 N are transferred to the outer ring of the bearing, i.e. to the outer bearing race, when the bearing diameter is in the range of $\phi$ 500 mm ... 800 mm.

What is claimed is:

1. A gear, which comprises a shaft (12) and on it a gearwheel (13), which is in engagement with a gearwheel (17) mounted on a shaft (16), and that the shaft (16) comprises first and second bearings (18 and 19) arranged along opposite sides of the gearwheel (17) between the frame (11) and the shaft (16), on which bearings the shaft (16) is fitted to revolve, characterized in that the gear comprises at least one spring fitted to act with a force (F) upon an outer race (18') of said first bearing (18); rolling members ($20a_1$) arranged between an inner race (18") of said first bearing (18) and said outer race (18') to thereby define a glide fitting arranged between a circumferential face ($C_1$) of said outer race (18') and said frame (11), whereby a force is transferred through the rolling members ($20a_1$, $20a_2 \ldots$) of said first bearing (18) to the inner race (18") of the bearing (18) and further to said second bearing (19) arranged along the opposite side of the gearwheel (17), and the play in the first and second bearings (18 and 19) arranged along opposite sides of the gearwheel (17), between the rolling members and the bearing (18, 19) races (18, 18";19', 19"), is eliminated.

2. A gear as claimed in claim 1, further comprising a ring (21) having a plurality of spring sockets and wherein said at least one spring comprises a plurality of spiral springs or cup springs each one said spiral springs or cup springs being arranged in one of said spring sockets, said plurality of spiral springs or cup springs being arranged to act with a force (F) away and outwards from a vertical center line (Y line) of said first bearing.

3. A gear as claimed in claim 2, wherein said ring (21) having a plurality of spring sockets comprises a plurality of screws and a plurality of corresponding holes equally spaced about a circumference of said ring, through which each of said holes one of said plurality of screws pass and are threaded into one of a plurality of threaded holes in the gear frame.

4. A gear as claimed in claim 1, characterized in that the said second bearing (19) is structured and arranged in such a way that both the inner race (19") and the outer race (19') of the bearings are in stationary positions in relation to the gear constructions connected with them.

5. A gear as claimed in claim 2, characterized in that said ring (21) having a plrality of spring sockets is connected to the gear frame (11) by means of screws between the side face (11$a_1$) of the gear frame and the side face ($D_1$) ofthe gearwheel (17) on the rotatable shaft (16).

6. A gear as claimed in claim 1, characterized in that the first bearing (18) upon which the said at least one spring is fitted so on the gear frame (11) so that said glide fitting is defined between the circumferential face ($C_1$) ofthe outer race (18') of the first bearing (18) and the gear frame (11), and that the inner race (18") of the first bearing is fitted fixedly on the shaft (16).

7. In a gear including a frame, a first shaft, a first gearwheel arranged on the first shaft, a second shaft, a second gearwheel arranged on said second shaft and in engagement with the first gearwheel and first and second bearings arranged on a respective first and second side of the second gearwheel between the frame and the second shaft for revolvingly supporting the second shaft relative to the frame, the improvement comprising:

the first bearing including an inner race adjacent the second shaft, an outer race adjacent an opposed surface of the frame and rolling members arranged between said inner race and said outer race, said outer race having a circumferential face movable relative to the opposed surface of the frame to thereby define a glide fitting between said outer race and the opposed surface of the frame, the second bearing including an inner race adjacent the second shaft, an outer race adjacent an opposed surface of the frame and rolling members arranged between said inner race and said outer race, and at least one spring arranged to provide a force upon said outer race of the first bearing to enable movement of said outer race relative to the frame, whereby the force is transferred through said rolling members of the first bearing to said inner race of the first bearing and further to the second bearing such that any play in the first and second bearings between the rolling members and the respective inner and outer races is eliminated.

8. The gear of claim 7, wherein said at least one spring is selected from a group consisting of a spiral spring and a cup spring.

9. The gear of claim 7, further comprising a ring surrounding the second shaft, said ring defining at least one spring socket for housing a respective one of said at least one spring.

10. The gear of claim 9, further comprising connecting means for connecting said ring to the frame.

11. The gear of claim 10, wherein said connecting means comprise screws arranged between a side face of the frame and a side face of the second gearwheel.

12. The gear of claim 9, wherein each of said at least one spring is a spiral spring.

13. The gear of claim 9, wherein said ring includes holes equally spaced about a circumference of said ring, further comprising screws passing through said holes for connecting said ring to the frame.

14. The gear of claim 7, wherein said at least one spring comprises a plurality of springs, further comprising a ring surrounding the second shaft, said ring defining a plurality of spring sockets each housing a respective one of said springs.

15. The gear of claim 7, wherein said at least one spring is arranged to act with a force away and outward from a vertical center line of the first bearing.

16. The gear of claim 7, wherein said inner race of the second bearing is fixed to the second shaft and said outer race of the second bearing is fixed to the frame.

17. The gear of claim 7, wherein said inner face of the first bearing is fixedly mounted to the second shaft.

18. The gear of claim 7, wherein the first and second bearings are angular-contact ball bearings.

19. The gear of claim 7, wherein the first and second bearings are tapered roller bearings.

* * * * *